United States Patent
Iida

(10) Patent No.: US 8,149,436 B2
(45) Date of Patent: Apr. 3, 2012

(54) NETWORK FACSIMILE APPARATUS

(75) Inventor: Junichi Iida, Yokohama (JP)

(73) Assignee: Panasonic System Networks Co., Ltd., Fukuoka-Shi (JP)

( * ) Notice: Subject to any disclaimer, the term of this patent is extended or adjusted under 35 U.S.C. 154(b) by 1433 days.

(21) Appl. No.: 11/144,620

(22) Filed: Jun. 6, 2005

(65) Prior Publication Data

US 2005/0223015 A1    Oct. 6, 2005

Related U.S. Application Data

(60) Continuation of application No. 10/385,471, filed on Mar. 12, 2003, now Pat. No. 7,113,304, which is a division of application No. 09/314,960, filed on May 20, 1999, now Pat. No. 6,952,279.

(30) Foreign Application Priority Data

Dec. 28, 1998 (JP) .................................. 10-372959

(51) Int. Cl.
*G06F 3/12* (2006.01)
*G06K 15/00* (2006.01)
*H04N 1/00* (2006.01)
*G06F 15/16* (2006.01)
*G06F 15/167* (2006.01)
*G06F 7/00* (2006.01)

(52) U.S. Cl. ............... 358/1.15; 358/1.14; 358/1.16; 358/400; 358/402; 358/434; 358/440; 709/203; 709/212; 709/217; 707/695

(58) Field of Classification Search ............ 358/1.15, 358/1.14, 402, 440, 1.16, 434, 400; 707/10, 707/203, 204, 104.1, 212, 1, 205, 9, 695; 709/212, 203, 217
See application file for complete search history.

(56) References Cited

U.S. PATENT DOCUMENTS 5,559,721 A  9/1996  Ishii
5,649,188 A  7/1997  Nomura et al.
(Continued)

FOREIGN PATENT DOCUMENTS

EP  0785482  7/1997
(Continued)

OTHER PUBLICATIONS

English Language Abstract of JP 7-038693.
(Continued)

*Primary Examiner* — King Poon
*Assistant Examiner* — Neil R McLean
(74) *Attorney, Agent, or Firm* — Greenblum & Bernstein, P.L.C.

(57) ABSTRACT

A communication apparatus is connected to a terminal apparatus via a network. The communication apparatus includes a storage that stores a document file and an HTML file of a user setting page. A file manager stores a storage period for the document file, determines whether or not the document file has been stored in the storage for the storage period, and deletes the document file when the document file has been stored in the storage for the storage period. A web server transmits, to the terminal apparatus, the HTML file of the user setting page, the user setting page configured so that a user at the terminal apparatus can request a change of the storage period. The web server further instructs the file manager to change the storage period, when the user requests the change of the storage period.

16 Claims, 21 Drawing Sheets

U.S. PATENT DOCUMENTS

| | | | |
|---|---|---|---|
| 5,675,507 | A | 10/1997 | Bobo, II |
| 5,717,493 | A | 2/1998 | Ozawa et al. |
| 5,737,395 | A | 4/1998 | Irribarren |
| 5,786,817 | A | 7/1998 | Sakano et al. |
| 5,805,298 | A | 9/1998 | Ho et al. |
| 5,813,009 | A * | 9/1998 | Johnson et al. ............. 707/695 |
| 5,828,376 | A | 10/1998 | Solimene et al. |
| 5,848,137 | A | 12/1998 | Hsiao |
| 5,862,202 | A | 1/1999 | Bashoura et al. |
| 5,862,325 | A * | 1/1999 | Reed et al. ............... 709/201 |
| 5,870,549 | A | 2/1999 | Bobo, II |
| 5,872,845 | A | 2/1999 | Feder |
| 5,881,233 | A | 3/1999 | Toyoda et al. |
| 6,009,153 | A | 12/1999 | Houghton |
| 6,025,931 | A | 2/2000 | Bloomfield |
| 6,088,125 | A | 7/2000 | Okada et al. |
| 6,088,717 | A * | 7/2000 | Reed et al. ............... 709/201 |
| 6,097,797 | A | 8/2000 | Oseto |
| 6,125,352 | A | 9/2000 | Franklin et al. |
| 6,157,706 | A | 12/2000 | Rachelson |
| 6,202,086 | B1 | 3/2001 | Maruyama et al. |
| 6,208,426 | B1 | 3/2001 | Saito et al. |
| 6,211,972 | B1 | 4/2001 | Okutomi et al. |
| 6,233,318 | B1 | 5/2001 | Picard |
| 6,246,487 | B1 | 6/2001 | Kobayashi et al. |
| 6,266,160 | B1 | 7/2001 | Saito et al. |
| 6,307,643 | B1 | 10/2001 | Okada et al. |
| 6,311,210 | B1 | 10/2001 | Foladare et al. |
| 6,351,316 | B2 | 2/2002 | Saito et al. |
| 6,374,291 | B1 | 4/2002 | Ishibashi et al. |
| 6,384,927 | B1 | 5/2002 | Mori |
| 6,385,655 | B1 | 5/2002 | Smith et al. |
| 6,396,592 | B1 | 5/2002 | Okada et al. |
| 6,396,848 | B1 | 5/2002 | Ohta |
| 6,434,222 | B1 | 8/2002 | Shaffer et al. |
| 6,453,327 | B1 | 8/2002 | Shaffer et al. |
| 6,501,568 | B1 | 12/2002 | Yoshida |
| 6,512,599 | B1 | 1/2003 | Hattori |
| 6,542,254 | B1 | 4/2003 | Fujiki |
| 6,587,219 | B1 | 7/2003 | Saito et al. |
| 6,614,548 | B1 | 9/2003 | Kisona |
| 6,633,871 | B1 * | 10/2003 | Jeyachandran et al. ............ 707/9 |
| 6,667,810 | B1 * | 12/2003 | Jeyachandran et al. ...... 358/1.14 |
| 6,707,580 | B1 | 3/2004 | Bloomfield |
| 6,717,688 | B1 | 4/2004 | Ogawa |
| 6,728,757 | B1 | 4/2004 | Friend |
| 6,731,410 | B2 | 5/2004 | Saito et al. |
| 6,791,703 | B1 * | 9/2004 | Maeda et al. ................ 358/1.15 |
| 6,801,340 | B1 | 10/2004 | Endo |
| 6,876,462 | B2 | 4/2005 | Okada et al. |
| 6,956,663 | B1 | 10/2005 | Iida |
| 7,274,474 | B2 * | 9/2007 | Yamaguchi et al. ......... 358/1.15 |
| 2003/0097361 | A1 | 5/2003 | Huang et al. |
| 2004/0006600 | A1 | 1/2004 | Miller et al. |

FOREIGN PATENT DOCUMENTS

| | | |
|---|---|---|
| EP | 0795295 | 9/1997 |
| EP | 0845894 | 11/1997 |
| EP | 845894 | 6/1998 |
| JP | 6-030038 | 2/1994 |
| JP | 6-35915 | 2/1994 |
| JP | 6-035915 | 2/1994 |
| JP | 6-119393 | 4/1994 |
| JP | 7-038693 | 2/1995 |
| JP | 7-129440 | 5/1995 |
| JP | 8-087548 | 4/1996 |
| JP | 8-251361 | 9/1996 |
| JP | 9-181874 | 7/1997 |
| JP | 9-200482 | 7/1997 |
| JP | 9-223096 | 8/1997 |
| JP | 9233243 | 9/1997 |
| JP | 10-063590 | 3/1998 |
| JP | 10107836 | 4/1998 |
| JP | 10-145493 | 5/1998 |
| JP | 10150462 | 6/1998 |
| JP | 10-179581 | 7/1998 |
| JP | 10-191010 | 7/1998 |
| JP | 10-1914010 | 7/1998 |
| JP | 10191010 | 7/1998 |
| JP | 10228428 | 8/1998 |
| JP | 10247179 | 9/1998 |
| JP | 10-285324 | 10/1998 |
| JP | 10-307792 | 11/1998 |
| JP | 10-308840 | 11/1998 |
| JP | 10326288 | 12/1998 |
| JP | 2000-196798 | 7/2000 |
| WO | 97/09682 | 3/1997 |
| WO | 97/38510 | 10/1997 |
| WO | 98/23058 | 5/1998 |

OTHER PUBLICATIONS

English Language Abstract of JP 8-251361.
English Language Abstract of JP 8-087548.
English Language Abstract of JP 7-129440.
English Language Abstract of JP 10-145493.
English Language Abstract of JP 9-181874.
English Language Abstract of JP 10-179581.
English Language Abstract of JP 6-030038.
English Language Abstract of JP 10-308840.
English Language Abstract of JP 9-223096.
English Language Abstract of JP 6-035915.
English Language Abstract of JP 10-1914010.
English Language Abstract of JP 10-307792.
English Language Abstract of JP 10-285324.
English Language Abstract of JP 6-119393.
English Language Abstract of JP 9-200482.
English Language Abstract of JP 10-063590.
Web Programming in Secret HTML, CGI, or Perl.
English Language Abstract for JP Appln. No. 9-233243.
English Language Abstract for JP Appln. No. 10-107836.
English Language Abstract for JP Appln. No. 10-247179.
English Language Abstract for JP Appln. No. 10-191010.
English Language Abstract for JP Appln. No. 10-150462.
English Language Abstract for JP Appln. No. 10-326288.
English Language Abstract for JP Appln. No. 10-228428.
English Language Abstract for JP Appln. No. 6-35915.
U.S. Appl. No. 60/111,341, (Huang).
English Language Abstract of JP 2000-196798.

* cited by examiner

FIG. 7

| DOCUMENT NUMBER | DOCUMENT FILE NAME | REGISTERED DATE | SENDER | TITLE |
|---|---|---|---|---|
| 0001 | fax0001.tif | 1998.08.03 14:45:31 | 03-1234-5678 | G3FAX RECEIVED DOCUMENT |
| 0002 | mail0001.tif | 1998.08.05 11:30:15 | ifax@abc.co.jp | MAP |
| 0003 | audio0001.wav | 1998.08.13 19:15:20 | 03-7789-1122 | TELEPHONE SPEECH |

```
<HTML>
<HEAD>
<TITLE>NETWORK RECEIVED DOCUMENT</TITLE>
</HEAD>
<BODY BGCOLOR="#ffffff" onLoad="focus()">
<FORM NAME="MyForm">
<INPUT TYPE="hidden" NAME="mbox" VALUE="ifax">

<Table Border="1" CellPadding="2">
<Tr><Th>SELECT</Th><Th>DOCUMENT NUMBER</Th><Th NOWRAP>
REGISTERED DATE </Th><Th> SENDER </Th><Th> TITLE </Th></Tr>
```

| | |
|---|---|
| `<!-- No.000300F3 -->`    ←DOCUMENT NUMBER HEX<br>`<Tr><Td><INPUT TYPE="checkbox" VALUE="00243"></Td>`<br>`<Td><A HREF="tiff/nim00243.tif">00243</A></td>`<br>`<Td>1998.10.07 20:45:53</Td>`<br>`<Td>ifax@tora.rdmg.mgcs.mei.co.jp</Td>`<br>`<Td>IMAGE from Internet FAX</Td></Tr>` | RECEPTION LIST FIRST LINE |
| `<!-- No.000300F0 -->`<br>`<Tr><Td><INPUT TYPE="checkbox" VALUE="00240"></Td>`<br>`<Td><A HREF="tiff/nim00240.tif">00240</A></td>`→DOCUMENT<br>`<Td>1998.10.07 20:14:53</Td>`→DATE           NUMBER<br>`<Td>ifax@eos5.rdmg.mgcs.mei.co.jp</Td>`→SENDER<br>`<Td>IMAGE from Internet FAX</Td></Tr>`→TITLE | RECEPTION LIST SECOND LINE |
| `<!-- No.000300ED -->`<br>`<Tr><Td><INPUT TYPE="checkbox" VALUE="00237"></Td>`<br>`<Td><A HREF="tiff/nim00237.tif">00237</A></td>`<br>`<Td>1998.10.07 20:08:51</Td>`<br>`<Td>ifax@eos5.rdmg.mgcs.mei.co.jp</Td>`<br>`<Td>IMAGE from Internet FAX</Td></Tr>` | RECEPTION LIST THIRD LINE |
| `<!-- No.000300EA -->`<br>`<Tr><Td><INPUT TYPE="checkbox" VALUE="00234"></Td>`<br>`<Td><A HREF="tiff/nim00234.tif">00234</A></td>`<br>`<Td>1998.10.07 18:00:04</Td>`<br>`<Td>ifax@usagi.rdmg.mgcs.mei.co.jp</Td>`<br>`<Td>IMAGE from Internet FAX</Td></Tr>` | RECEPTION LIST FOURTH LINE |
| `<!-- No.000300E9 -->`<br>`<Tr><Td><INPUT TYPE="checkbox" VALUE="00233"></Td>`<br>`<Td><A HREF="tiff/nim00233.tif">00233</A></td>`<br>`<Td>1998.10.07 17:55:35</Td>`<br>`<Td>ifax@usagi.rdmg.mgcs.mei.co.jp</Td>`<br>`<Td>IMAGE from Internet FAX</Td></Tr>` | RECEPTION LIST FIFTH LINE |

```
<!-- No.00000000 -->   ←INDICATE DATA END
</Table></UL>
</FORM>
</BODY>
</HTML>
```

FIG. 8

INTERNET RECEIVED DOCUMENT

| MENU | SELECT | DOCUMENT NUMBER | REGISTERED DATE | SENDER | TITLE |
|---|---|---|---|---|---|
| | ☐ | 00243 | 1998.10.07.20:45:53 | ifax@tora.rdmg.mgcs.mei.co.jp | IMAGE from Internet FAX |
| | ☐ | 00240 | 1998.10.07.20:14:53 | ifax@eos5.rdmg.mgcs.mei.co.jp | IMAGE from Internet FAX |
| | ☐ | 00237 | 1998.10.07.20:08:51 | ifax@eos5.rdmg.mgcs.mei.co.jp | IMAGE from Internet FAX |
| | ☐ | 00234 | 1998.10.07.18:00:04 | ifax@usagi.rdmg.mgcs.mei.co.jp | IMAGE from Internet FAX |
| | ☐ | 00233 | 1998.10.07.17:55:35 | ifax@usagi.rdmg.mgcs.mei.co.jp | IMAGE from Internet FAX |

[ SEND ]
[ PRINT ]
[ DELETE ]
[ EDIT ]
[ MOVE ]

[ HOME ]

|  |  |  |  |
|---|---|---|---|
| OBJECT FOLDER | INTERNET RECEPTION | | |
| SOURCE LIST | | | |
| TARGET LIST | | | |
| DOCUMENT NUMBER | 00150, | (EN-SIZE) | Reload |

MOVE — HOME

DETERMINE | RETRY | Close

FIG. 17

ADDRESS BOOK — HOME

MENU
ADD
DELETE
EDIT

| SELECT | NUMBER | NAME | TYPE | ADDRESS |
|---|---|---|---|---|
| ☐ | 1 | × × × × | F | TELEPHONE NUMBER |
| ☐ | 2 | × × × | M | MAIL ADDRESS |
| ☐ | 3 | × × × × | M | MAIL ADDRESS |
| ☐ | 4 | × × | F | TELEPHONE NUMBER |

FIG. 18

ADD TO ADDRESS BOOK

NAME

TYPE

ADDRESS

[DETERMINE] [RETRY] [Close]

FIG. 19

DELETE FROM ADDRESS BOOK

NAME

ADDRESS

[DETERMINE] [RETRY] [Close]

FIG. 20

NETWORK FACSIMILE APPARATUS

CROSS REFERENCE TO RELATED APPLICATIONS

This is a continuation of U.S. application Ser. No. 10/385,471, filed Mar. 12, 2003 now U.S. Pat. No. 7,113,304, which is a divisional of U.S. application Ser. No. 09/314,960, filed May 20, 1999 now U.S. Pat. No. 6,952,279, the entire disclosures of which are expressly incorporated herein in their entireties.

FIELD OF THE INVENTION

The present invention relates to a network facsimile apparatus capable of performing transmission and reception of facsimile data and e-mail data connecting to a PSTN and a network such as the internet or LAN.

DESCRIPTION OF THE RELATED ART

Recently, it has been performed to connect a personal computer, work station, FAX server or the like to a network in order to transmit and receive an e-mail and facsimile and to browse homepages.

FIG. 1 illustrates a system structure of the case of performing facsimile transmission and reception using a FAX server. The reception operation at a client machine (personal computer) will be described next. FAX modem 1001 receives a call from the PSTN and fetches image data to transmit to FAX server 1002. FAX server software operating at FAX server 1002 receives the image data, and stores the image data as an image data file at file server 1003 through the network. At this point, the storage of facsimile received data is finished.

To fetch the received image data into client machine 1004, a user starts a dedicated application at client machine 1004 and reads out the image data from file server 1003 through the network.

Further, a method of reusing facsimile received data by combining an internet FAX and a WWW server has been recently proposed. The method utilizes the function of the internet FAX which converts data received from the PSTN into an e-mail.

FIG. 2 illustrates a system structure of the case of performing facsimile transmission and reception using an internet FAX and a WWW server. The reception operation at the client machine will be described.

Image data received at internet FAX 1101 via the PSTN is converted into an attached file format to an e-mail at internet FAX 1101 and is transmitted to WWW server 1103 as an attached file of e-mail.

The e-mail with the attached file transferred from internet FAX 1101 is received at e-mail server 1102 via a network. The e-mail with the attached file received at e-mail server 1102 is transferred to WWW server 1103 that is a destination again via the network.

WWW server 1103 stores the attached file of e-mail as image data to link to a homepage for facsimile reception. The storage of facsimile received data is finished at this point.

In order to fetch received data into client machine 1104, a user starts a WWW browser at client machine 1104 and accesses to the homepage for facsimile reception at WWW server 1103. The user reads out an image data file at client machine 1104 via the network from WWW server 1103.

However, in the system using the above described FAX server, since image data is transferred from the FAX server to the file server and further transferred from the file server to the client machine until the client machine receives facsimile received data, there is a problem that network traffic is increased.

In addition, in the system using the above described FAX server and the WWW server, since image data is transferred from the internet FAX to the e-mail server, further transferred from the e-mail server to the WWW server, and furthermore transferred from the WWW server to the client machine until the client machine receives facsimile received data, there is a problem that network traffic is increased. Since image data attached to e-mail has a data capacity approximately 1.3 times that of binary data, the network traffic is further increased.

SUMMARY OF THE INVENTION

An object of the present invention is to provide a network facsimile apparatus which is able to decrease network traffic caused by data transmission.

The present invention provides a network facsimile apparatus which has a WWW sever inside the apparatus, and is able to generate a structured document of reception list to provide to a client in homepage format in order to provide received data selected in the reception list to the client.

Further, the present invention provides a network facsimile apparatus which is able to provide a received document (reception list) from the WWW server installed inside the network facsimile apparatus, to display a structured document for address book or device setting to a client, and to easily rewrite the structured document for address book or device setting in response to a request from the client.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 7 is a structure diagram of a reception list management table;

FIG. 8 is a diagram illustrating a data example of a source file of a reception list html;

FIG. 14 is a structure diagram of an internet received document page provided by the network facsimile apparatus according to the above embodiment;

FIG. 15 is a structure diagram of a reception list delete page provided by the network facsimile apparatus according to the above embodiment;

FIG. 16 is a structure diagram of a reception list edit page provided by the network facsimile apparatus according to the above embodiment;

FIG. 17 is a structure diagram of a reception list move page provided by the network facsimile apparatus according to the above embodiment;

FIG. 18 is a structure diagram of an address book page provided by the network facsimile apparatus according to the above embodiment;

FIG. 19 is a structure diagram of an address book add page provided by the network facsimile apparatus according to the above embodiment;

FIG. 20 is a structure diagram of an address book delete page provided by the network facsimile apparatus according to the above embodiment;

DETAILED DESCRIPTION OF PREFERRED EMBODIMENTS

Figure 1:
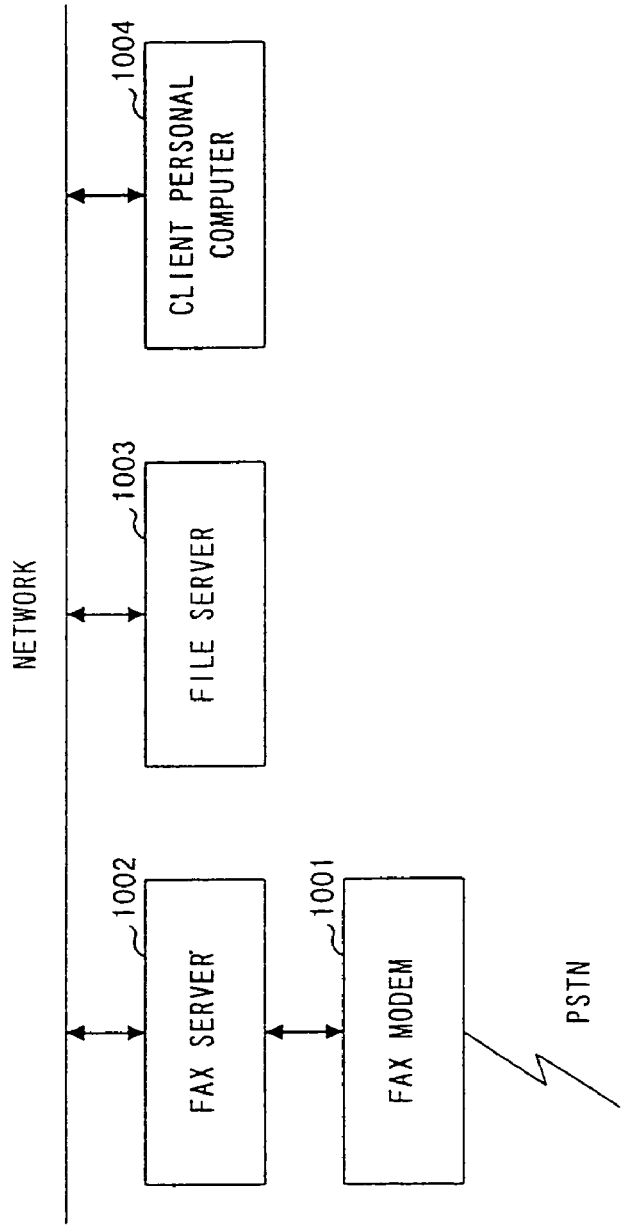
FIG. 1 is a configuration diagram of facsimile transmission and reception system using a FAX server.
Figure 2:
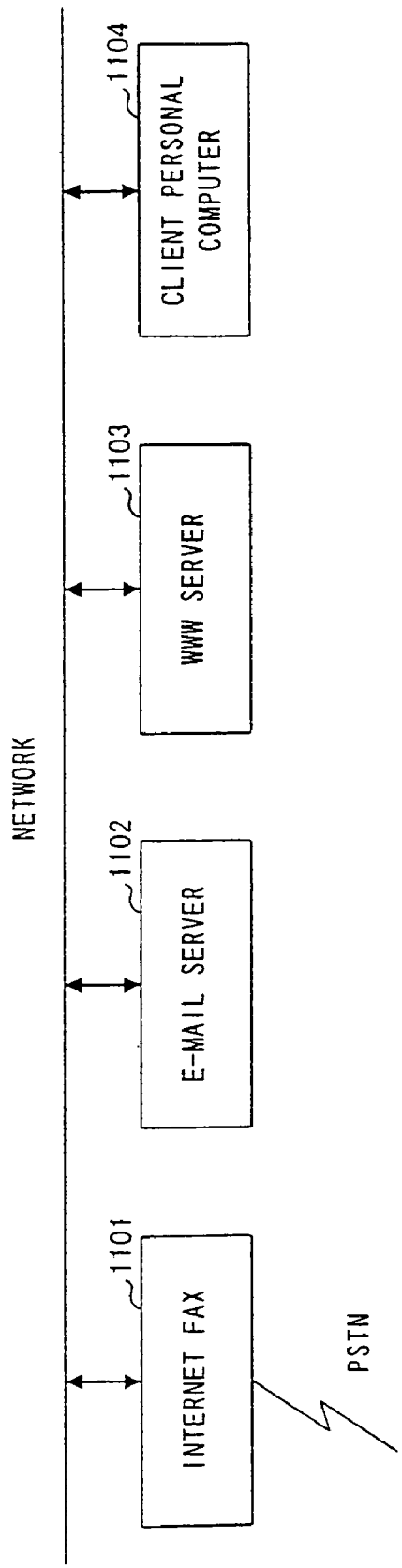
FIG. 2 is a configuration diagram of facsimile transmission and reception system using an Internet FAX and a WWW server.
Figure 3:
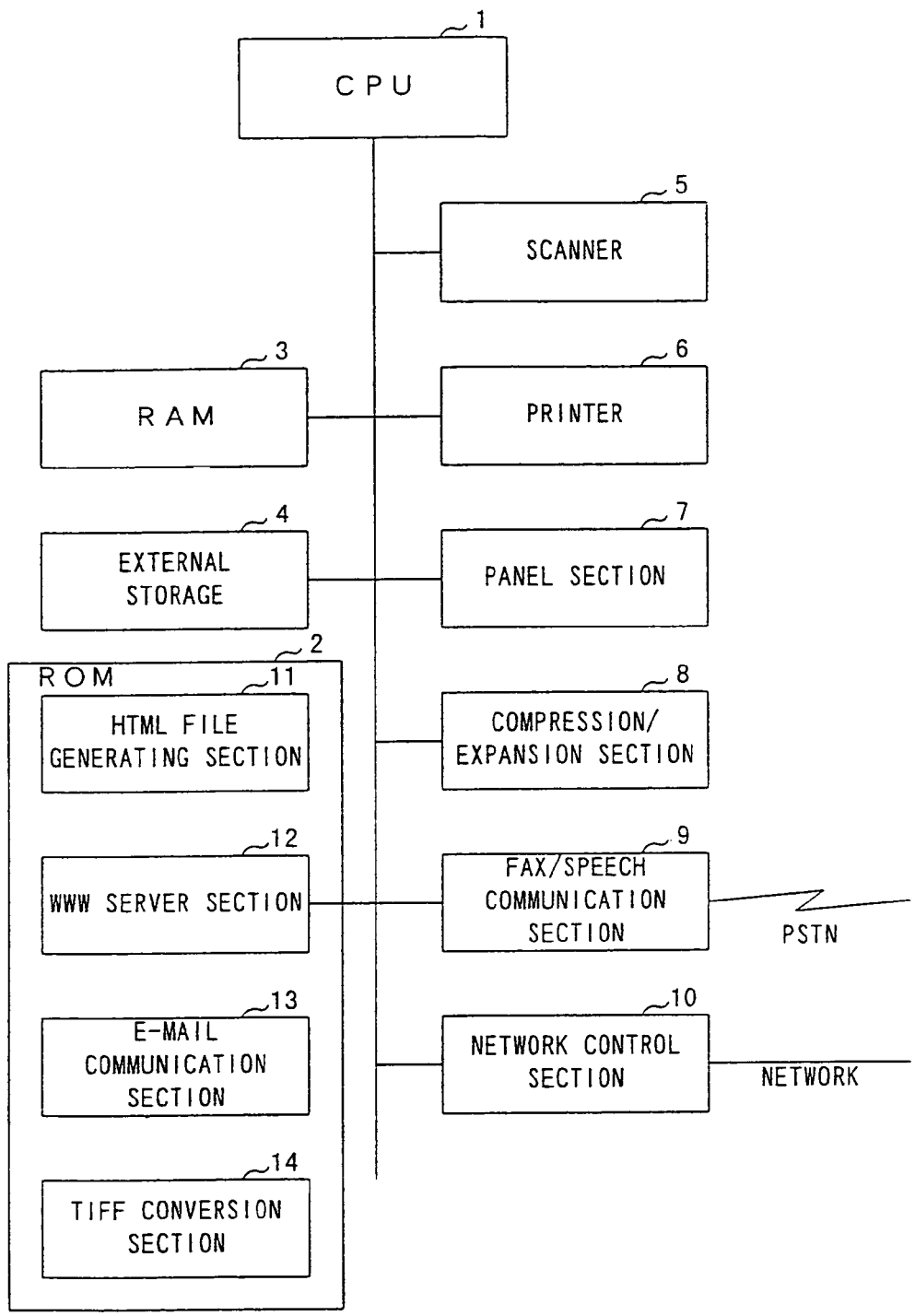
FIG. 3 is a function block diagram of a network facsimile apparatus according to an embodiment of the present invention.

FIG. 3 illustrates a function block diagram of a network facsimile apparatus according to this embodiment. ROM 2, RAM 3 and external storage 4 are connected to CPU 1 that operates by an operating system and is accessible to ROM 2, RAM 3 and external storage 4. Various programs such as processing program for a server side are stored at ROM 2. RAM 3 is used, for example, as a working area of programs stored in ROM 2. Compressed image data and HTML files are stored at external storage 4.

In addition, the network facsimile apparatus according to this embodiment has scanner 5, printer 6, panel section 7, compression/expansion section 8, FAX/speech communication section 9 and network controller 10 which operate under the control of CPU 1.

The network facsimile apparatus performs scanning of image data of, for example, document by scanner 5, and performs printing of scanned imaged and received imaged data at printer 6. A user is able to perform operations such as an instruction to scan image data and an enter of destination address using panel section 7. Compression/expansion section 8 performs expansion of received image data and compression of scanned image data. FAX/speech communication section 9 performs facsimile communication and speech communication connecting to a PSTN. Network controller 10 performs the internet communication connecting to a network.

The programs stored in ROM 2 includes each program for HTML file generating section 11, WWW server section 12, e-mail communication section 13 and TIFF conversion section 14. Although each function of HTML file generating section 11, WWW server section 12, e-mail communication section 13 and TIFF conversion section 14 is provided under the respective program executed by CPU 1, the respective function will be described using respective numeral symbol provided to the respective program as illustrated in FIG. 3 as a matter of accommodation.

HTML file generating section 11 is a function block that converts lists of image data received by facsimile and e-mail and other data into HTML files readable on a homepage to register to a server.

WWW server section 12 provides a server function of, for example, performing communication with a WWW browser in accordance with HTTP protocol to exchange homepage data (HTML file).

E-mail communication section 13 performs transmission and reception of e-mail via a network, while functions as an e-mail server. In addition, TIFF conversion section 14 provides a function of converting coded facsimile data and document file data into TIFF format.

Figure 4:
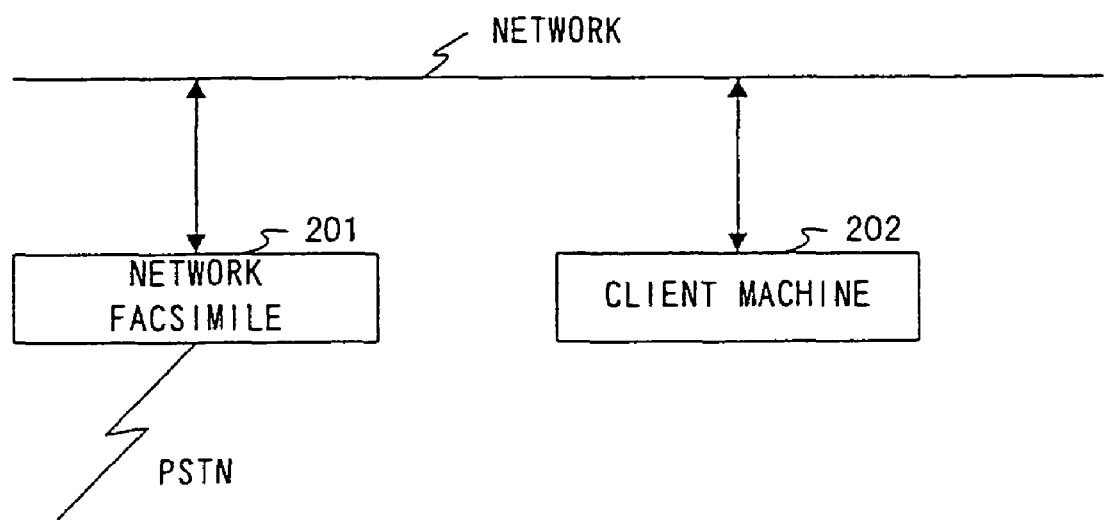
FIG. 4 is a configuration diagram of a system in which the network facsimile apparatus according to the above embodiment is connected to a client machine.

FIG. 4 illustrates a system configuration in the case of connecting a network facsimile apparatus according to this embodiment to a PSTN and a network. In FIG. 4, network facsimile apparatus 201 is connected to the PSTN while connected to the network through a network interface. It is possible to browse at client machine 202 a homepage provided at network facsimile apparatus 201 by operating a WWW browser at client machine 202.

Figure 5:
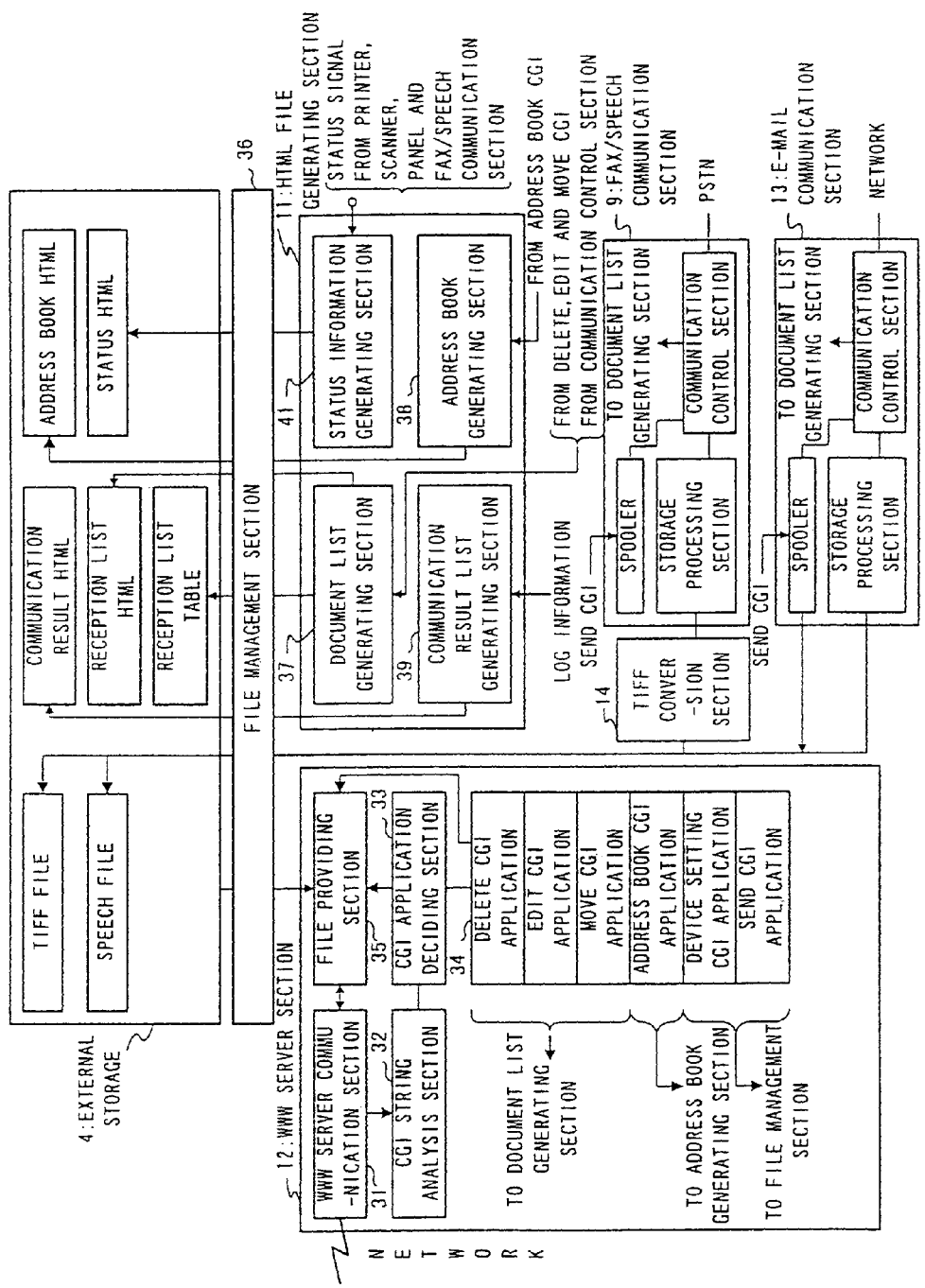
FIG. 5 is a function block diagram illustrating a flow of a part of processing in the network facsimile apparatus according to the above embodiment.

FIG. 5 illustrates a function block diagram for HTML file generating section 11, WWW server section 12, e-mail communication section 13, TIFF conversion section 14 and FAX/speech communication section 9 and a flow of data processing between the blocks.

In WWW server section 12, WWW server communication section 31 communicates with a WWW browser operating at client machine 202 in accordance with HTTP protocol. A command received at www server communication section 31 from client machine 202 is analyzed at CGI string analysis section 32.

When a character sequence for the CGI processing is detected in the received data, CGI string analysis section 32 provides the received data to CGI application deciding section 33 and starts corresponding CGI application 34. CGI application 34 decodes the URL encoded received data to execute the predetermined processing. CGI application 34 includes applications for, for example, transmission, processing such as delete, edit and move for HTML document, generation of address book, and device setting.

File providing section 35 receives a file, whose file request is provided from client machine 202, from a file management section 36 to provide to WWW server communication section 31. When the file request does not requires the CGI processing, file providing section 35 requires a corresponding file to file management section 36.

HTML file generating section 11 has document list generating section 37 that generates a HTML file of document list and address book generating section 38 that generates a HTML file of address book.

Document list generating section 37 generates a HTML file of reception list indicative of received e-mail and received FAX and performs a delete, edit and move of a part of the HTML file according to an instruction provided from CGI application 34 and received data.

Address book generating section 38 modifies the HTML file of address book according to an instruction from the address book CGI application and received data. Further, address book generating section 38 executes processing to incorporate the latest address table data into the HTML file of address book when power is turned on and the content of the address book is changed.

In addition, HTML file generating section 11 has communication result list generating section 39 and status information generating section 41. Communication result list generating section 39 receives log information indicative of communication result from FAX/speech communication section 9 and e-mail communication section 13 to generate and update the HTML file indicative of the communication result list. Status information generating section 41 fetches status signals indicative of respect status from scanner 5, printer 6, panel section 7 and FAX/speech communication section 9 (for example, eruption of paper stack, lack of toner and on-communication) to generate and update a HTML file in which the respective statuses are registered.

FAX/speech communication section 9 and e-mail communication section 13 each has a communication control section, storage processing section and spooler. The communication control section of FAX/speech communication section 9 is connected to the PSTN and the communication control section of e-mail communication section 13 is connected to various networks, for example, the internet as a representative, through a LAN or dial-up.

The operation of the network facsimile apparatus according to this embodiment will be described next. Hereinafter, each operation of generation of reception list, edit of reception list, box move of reception list, generation of address book and device setting will be described separately.

Figure 6:
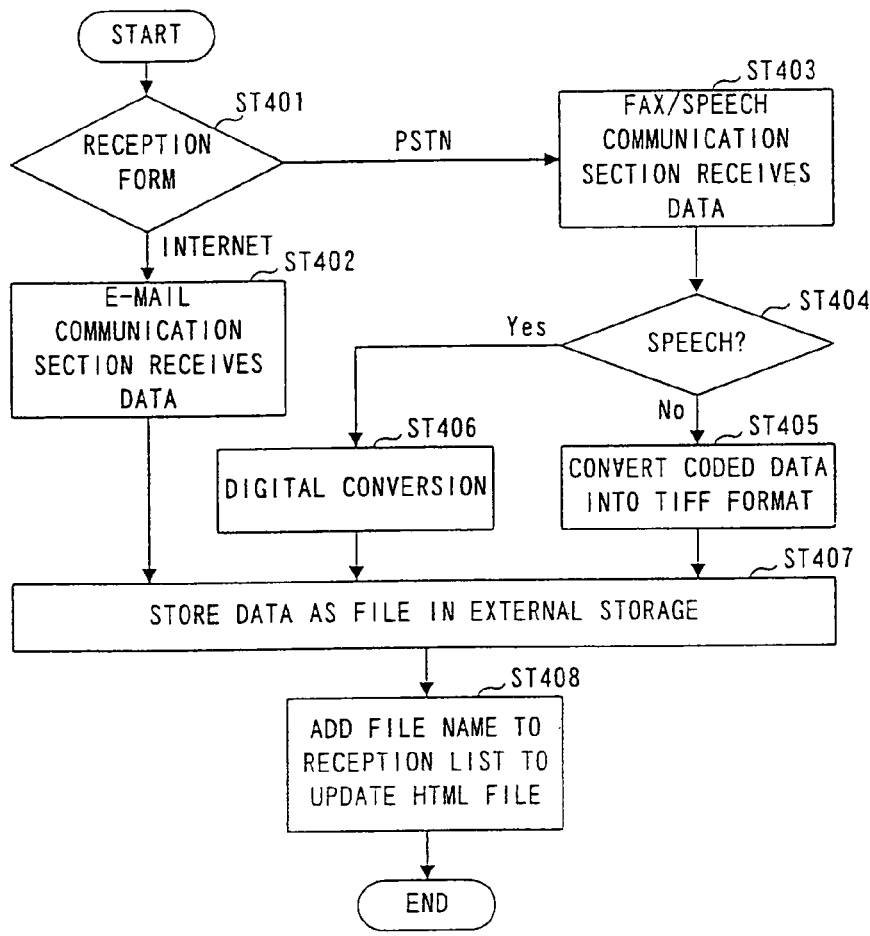
FIG. 6 is a flowchart of an operation to generate a reception list in the network facsimile apparatus according to the above embodiment.

FIG. 6 illustrates a flowchart of an operation to generate a reception list. The network facsimile apparatus registers the reception list of received data received at FAX/speech communication section 9 and e-mail communication section 13 to a homepage.

When a data reception occurs, it is decided whether the reception is performed via the PSTN or the internet (ST401). When e-mail communication section 13 receives an e-mail, the reception is performed via the internet. In this case, e-mail communication section 13 receives the e-mail (ST402). When attached data is image data in TIFF (Tag Images File Format) that is a standard format for an image file, e-mail communication section 13 stores the image data at external storage 4 providing a file name such as, for example, "mail0001.tif" (ST407). When attached data is speech data, e-mail communication section 13 stores the speech data at external storage 4 providing a file name such as, for example, "audio0001.wav" (ST407).

On the other hand, when FAX/speech communication section 9 receives FAX data or speech data, the reception is performed via the PSTN. When the reception is performed via the PSTN, FAX/speech communication section 9 receives imaged data or speech data (ST403), and decides whether or not the reception data is speech data (ST404). When the received data is coded image data, FAX/speech communication section 9 requests TIFF conversion section 14 to convert the coded data into TIFF format (ST405). FAX/speech communication section 9 provides a file name (for example, "fax000.tif") to the TIFF-converted received data to store at external storage 4 (ST407). When the received data is speech data, FAX/speech communication section 9 converts the speech data into digital data (ST406) and stores the speech file provided with a file name at external storage 4 (ST407).

After the received data is stored at external storage 4, HTML file generating section 11 adds the file name to the reception list and updates the HTML file of reception list (ST408).

The update of the HTML file of reception list will be described specifically. Document list generating section 37 at HTML file generating section 11 updates the HTML file of reception list. Document list generating section 37 manages a reception list table stored at external storage 4. FIG. 7 illustrates an example of a structure of a reception list management table. In the reception list management table, a document file name, registered data, a sender and a title are registered for every document number that is provided in order of reception.

Document list generating section 37 receives the document file name, registered data, sender and title from FAX/speech communication section 9 or e-mail communication section 13 that receives corresponding data. Document list generating section 37 reads out the reception list through file management section 36, adds the document number to the reception list, and registers the document file name, registered data, sender and title to the reception list. Document list generating section 37 returns the reception list in which the document name and the other items of the received data are registered to the reception list table, while reads out a reception list html (HTML file of reception list).

FIG. 8 illustrates a source file of reception list html generated with respect to the received data via a network. As illustrated in FIG. 8, a comment line is inserted at a head for every reception list. Recognition data indicative of reception form and a document number are described at the position of the comment line. The comment line is followed by a document number, data, sender and title that are described in HTML document. An example of a structure of the reception list indicated based on the reception list html in FIG. 8 is illustrated in FIG. 14.

Document list generating section 37 converts a document number, data, sender and title of new received data into HTML document to generate list data. Document list generating section 37 further searches the reception list html from the head to detect the first comment line (<!--) that is the first line of the current reception list, and inserts list data of the above-described new received data to the first line of the reception list. When the updated reception list html is returned to external storage 4, the list of the new received data is registered to the homepage. Specifically, document list generating section 37 reads the HTML file that is prepared in advance to indicate a reception list page and writes a character sequence indicative of, for example, document number that is newly stored management data in the reception list table in order to edit. "00243" that is a character sequence of the edited document number is tagged with <A HREF="ifax0001.tif">, thereby the character sequence "000243" is linked to ifax0001.tif that is the received file.

In addition, with respect to FAX reception list concerning FAX received image data and speech reception list concerning received speech data, the lists are similarly generated in HTML document.

As described above, when FAX/speech communication section 9 receives FAX data or e-mail communication section 13 receives an e-mail, since data necessary for the list generation (for example, sender and title) is input to document list generating section 37 and document list generating section 37 reads out the HTML file of reception list from external storage 4 and adds the new data to the reception list, client machine 202 is able to obtain a supply of the latest reception list in homepage format by accessing to WWW server section 12.

An operation of transmitting data received and stored at the network facsimile apparatus to client machine 202 will be described next according to a flowchart in FIG. 9.

The network facsimile apparatus is in a stand-by state until a homepage address (URL address) is entered.

Client machine 202 connected to a network starts a WWW browser (homepage browsing software) and enters the URL address of the network facsimile apparatus to access the homepage (ST701).

Figure 10:
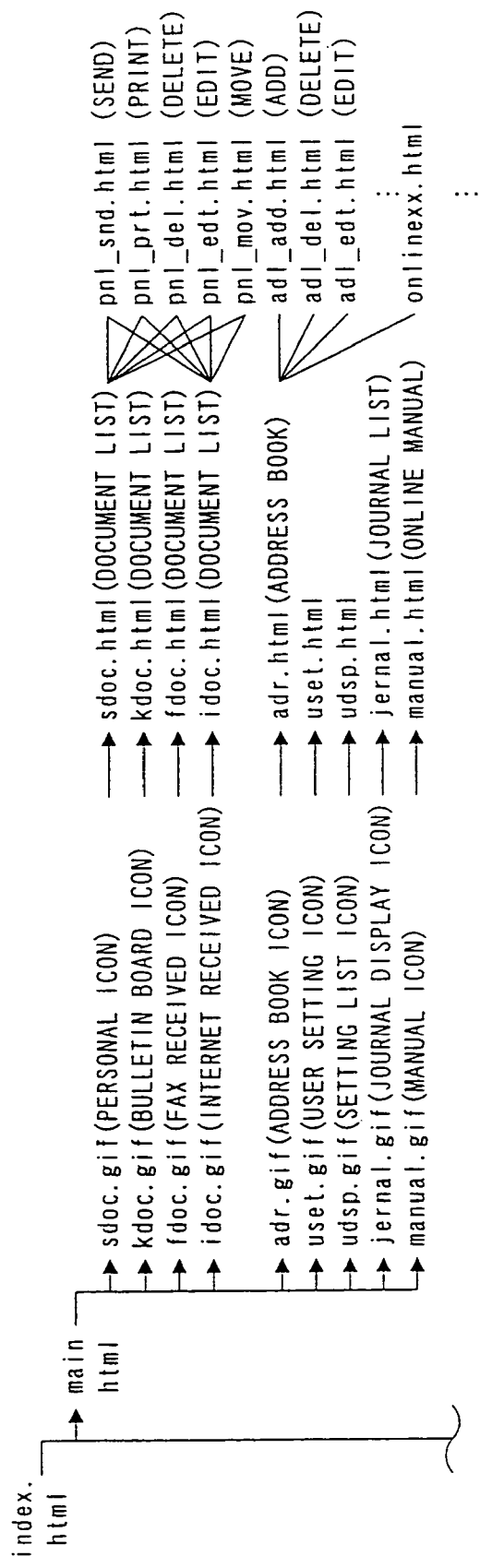
FIG. 10 is a diagram illustrating a file relation table of HTML files managed by the network facsimile apparatus according to the above embodiment.

In the network facsimile apparatus accessed, WWW server section 12 initiates the processing through network controller 10. File providing section 35 at WWW server section 12 responds to a command for requesting a file of the homepage main page (index html) received from client machine 202 and reads out the corresponding file from external storage 4 to return to the WWW browser at client machine 202 (ST702). FIG. 10 illustrates a file relation table of the HTML files registered at external storage 4. The files needed to display the homepage are related to the file of the homepage main page.

When the WWW browser at client machine 202 receives the file of homepage main page, the WWW browser analyzes the content and transmits a command for requesting the files needed to display the homepage to WWW server section 12 (ST703). For example, when the homepage main page illustrated in FIG. 10 is displayed, the WWW browser requests files necessary for respective icon display of facsimile received document, internet received document, personal box, bulletin board document, address book, communication result report, user setting and setting list (sdoc.gif, kdoc.gif, etc. illustrated in FIG. 10) to WWW server section 12.

When WWW server section 12 receives the request of files needed to display the homepage main page, WWW server 12 section transmits the files stored at external storage 4 to the WWW browser at client machine 202 (ST704). Thus, the homepage of the network facsimile apparatus is displayed on a screen of client machine 202 (ST705). The network facsimile apparatus stands by until next selection is performed.

Figure 9:
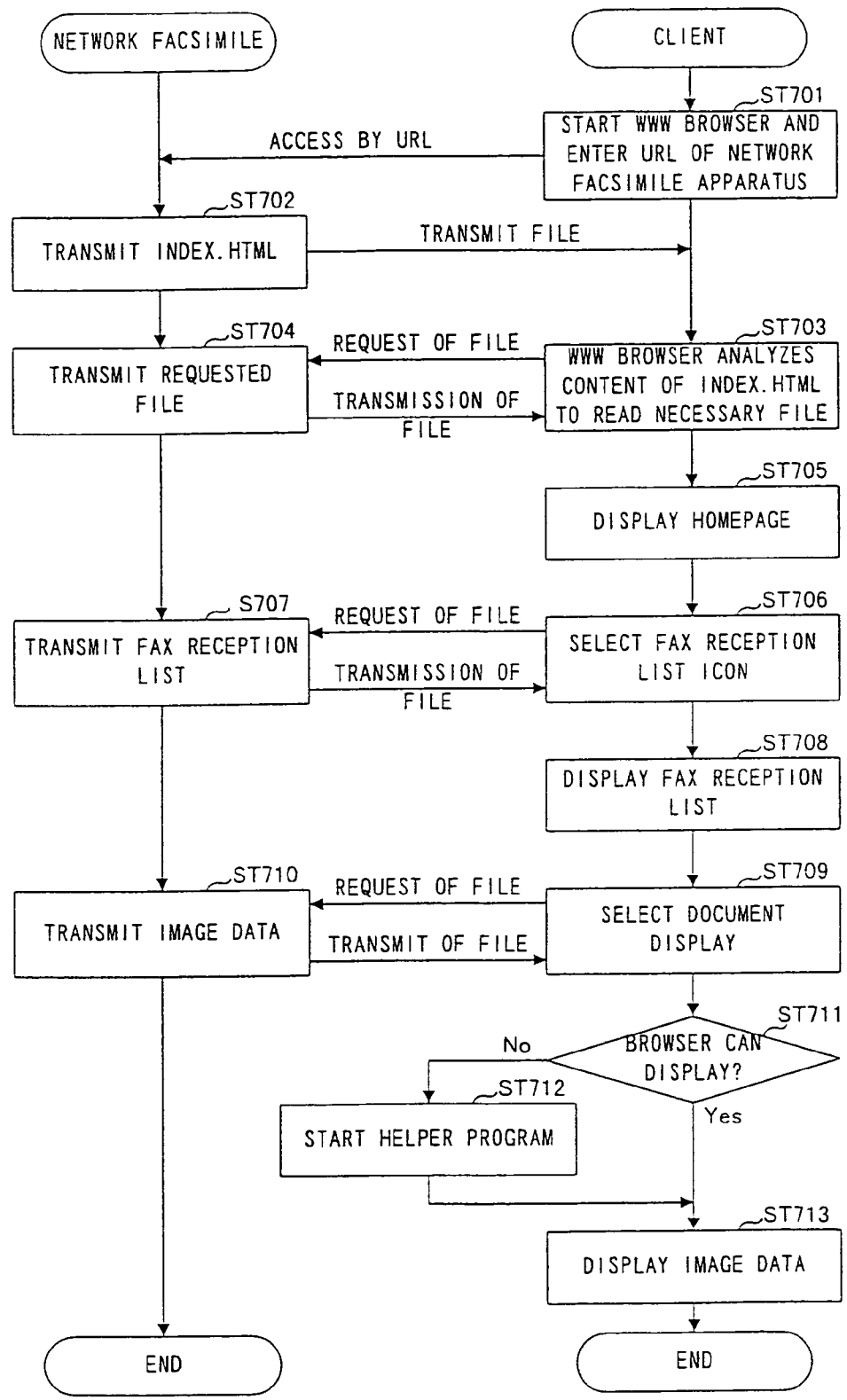
FIG. 9 is a flowchart of an operation for transmitting data received and stored at the network facsimile apparatus according to the above embodiment.

The network facsimile apparatus awaits until an icon that is desired by a user is selected on the main page illustrated in FIG. 9 displayed at client machine 202. For example, assume that "FAX reception list" is selected among from displayed data. When a "FAX reception list" icon is selected, a file request is generated for the FAX reception list that is linked to a display position of the icon (ST706).

As illustrated in FIG. 10, the icon of "FAX reception list" is linked to the corresponding HTML file (fdoc.html). The WWW browser is able to display the FAX reception list using fdoc.html. When WWW server section 12 receives the file request for fdoc.html, WWW server section 12 reads out the corresponding file from external storage 4 to transmit to client machine 202 (ST707).

The WWW browser at client machine 202 displays a page of "FAX reception list" according to the HTML file of "FAX reception list" received from WWW server section 12 (ST708).

When a user selects an indication of a desired file number among from the FAX reception list at the client machine (ST709), the network facsimile apparatus transmits an image data file (ST710). When it is not possible to display the image data on the WWW browser at the client machine 202 (for example, file0001.tif), the image data is displayed using the helper application to display the TIFF file (ST713).

The aforementioned example describes about the case of displaying FAX received data. However, when a speech file is selected, the speech data linked to the speech file is played back at a speaker of the client machine. The speech data includes speech data that the user records at a receiver of the network facsimile apparatus besides the speech data received from outside, and it is possible to link these speech data to the homepage and also to transmit toward outside.

Figure 12:
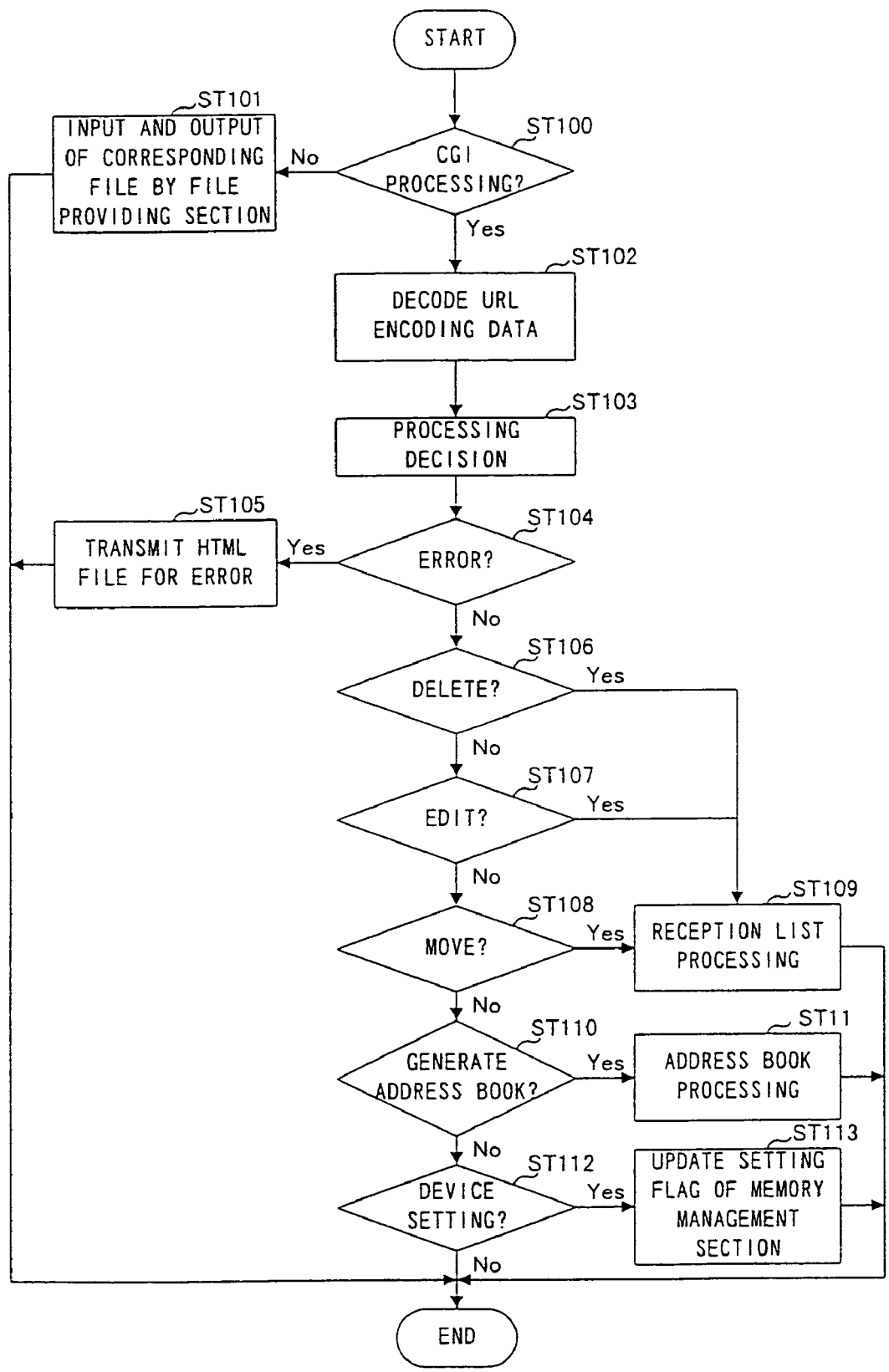
FIG. 12 is a flowchart illustrating an operation of a WWW server communication section in the network facsimile apparatus according to the above embodiment.

The operation of WWW server section 12 will be described next. FIG. 12 is a flowchart illustrating the operation of WWW server section 12. WWW server communication section 31 receives a request and returns a reply from/to client machine 202 via a network by operating in accordance with HTTP protocol. The types of requests that WWW server communication section 31 receives are principally separated into a file request and CGI processing request according to a command.

The received data (request) received at WWW server communication section 31 is provided to CGI string analysis section 32. CGI string analysis section 32 analyzes the CGI string using the received data. When the CGI processing is not executed (ST100), file providing section 35 fetches the corresponding file from external storage 4 based on the document number contained in the received data to return to the client (ST101).

CGI string analysis section 32 decodes a URL encoded portion in the received data (ST102). The decoded data that is the CGI string analysis result is provided to CGI application deciding section 33. When CGI application deciding section 33 makes an error decision, for example, in the case where the decoded data requests the CGI processing but the application name is not designated (ST104), CGI application deciding section 33 provides an error notification to file providing section 35 and fetches the HTML file for the error notification from external storage 4 to transmit to the client machine (ST105).

When the error processing is not executed at ST104, the processing is executed according to the content of the CGI application. The CGI application supported by WWW server section 12 of this embodiment includes delete, edit, move of various reception lists, generation and incorporation of address book and device setting.

As a result of the decision processing by CGI application deciding section 33, when the decoded data requests to (1) delete the designated document number from a HTML file of a reception list (ST106), (2) replace the data of designated document number with the edited data, or (3) move the designated document number to anther HTML file of another reception list (ST108), CGI application deciding section 33 executes respective reception list processing (ST109). The content of the reception list processing will be described later.

Further, as a result of the decision processing by CGI application deciding section 33, when the decoded data requests (4) to reflect the contents of the address book (added address, data delete and data modification) in the HTML file of the address book (ST110), CGI application deciding section 33 provides the received data to the address book CGI application to execute address book processing. (ST111).

Furthermore, as a result of the decision processing by CGI application deciding section 33, when the decoded data requests (5) to update the content of the device setting set at file management section 36 (ST112), CGI application deciding section 33 provides the received data to the device setting CGI application to execute update processing of setting flag of file management section 36 (ST113).

As the premise that the reception list processing is executed at ST109 described above, the necessary data is entered on a HTML document page at client machine 202. At ST706 of the flowchart illustrated in FIG. 9, an internet reception list icon on the homepage main page (HTML document page) is selected. According to the selection, the file request of the HTML file linked to the internet reception list is performed to WWW server section 12.

At external storage 4 at the server side, the HTML file of the internet reception list is registered as described above, and is updated by document list generating section 37 whenever an e-mail reception is performed. In WWW server section 12, file providing section 35 requests file management section 36 to read out the corresponding file in response to the file request from client machine 202, while transmits the read HTML file of the internet reception list to client machine 202.

The WWW browser at client machine 202 displays the internet reception list composed of HTML document according to the HTML file of the received internet reception list on a screen.

FIG. 14 illustrates a page of the internet reception list composed of the HTML document. In this embodiment, the page is composed of a list having document number, registered data, sender, title and check icon, and a frame menu in which icons of send, print, delete, edit and move are lined up. It is thus possible to provide the internet received document page to a user.

A user selects a document number of operation object on the internet received document page in FIG. 14. The document number is selected by checking a select-box. After selecting the document number, the user selects any operation from the frame menu.

In the case of selecting a "send" icon as an operation content, it is possible to send a file of document number indicated on the reception list to a destination address. When the "send" icon is selected, the WWW browser requests a HTML document composing a send page to WWW server section 12. The send page has boxes to which a document number to be sent and an destination address (FAX number or e-mail address) are entered. When the WWW browser at the client machine acquires the HTML document of the send page, the send page is displayed on a screen based on the HTML document. A user enters the document number and destination address (FAX number or e-mail address) on the send page and then pushes a determine-button. When the determine-button is pushed, the send CGI application is selected and the browser transmits the request data in which the document number and destination address are set to WWW server section 12.

WWW server section 12 starts the send CGI application when receives the request data. The document number and destination address of the send object are provided to the corresponding communication section. For example, when the destination address is an e-mail address, the document number and the e-mail address of the destination address are input to e-mail communication section 13. E-mail communication section 13 fetches the file of the designated document number from external storage 4 through file management section 36 and makes the file an e-mail to send to the destination address.

In addition, when a user selects a "delete" icon, the WWW browser at the client machine 202 provides the file request for the HTML file linked to the "delete" icon to WWW server section 12.

Figures 15, 16:
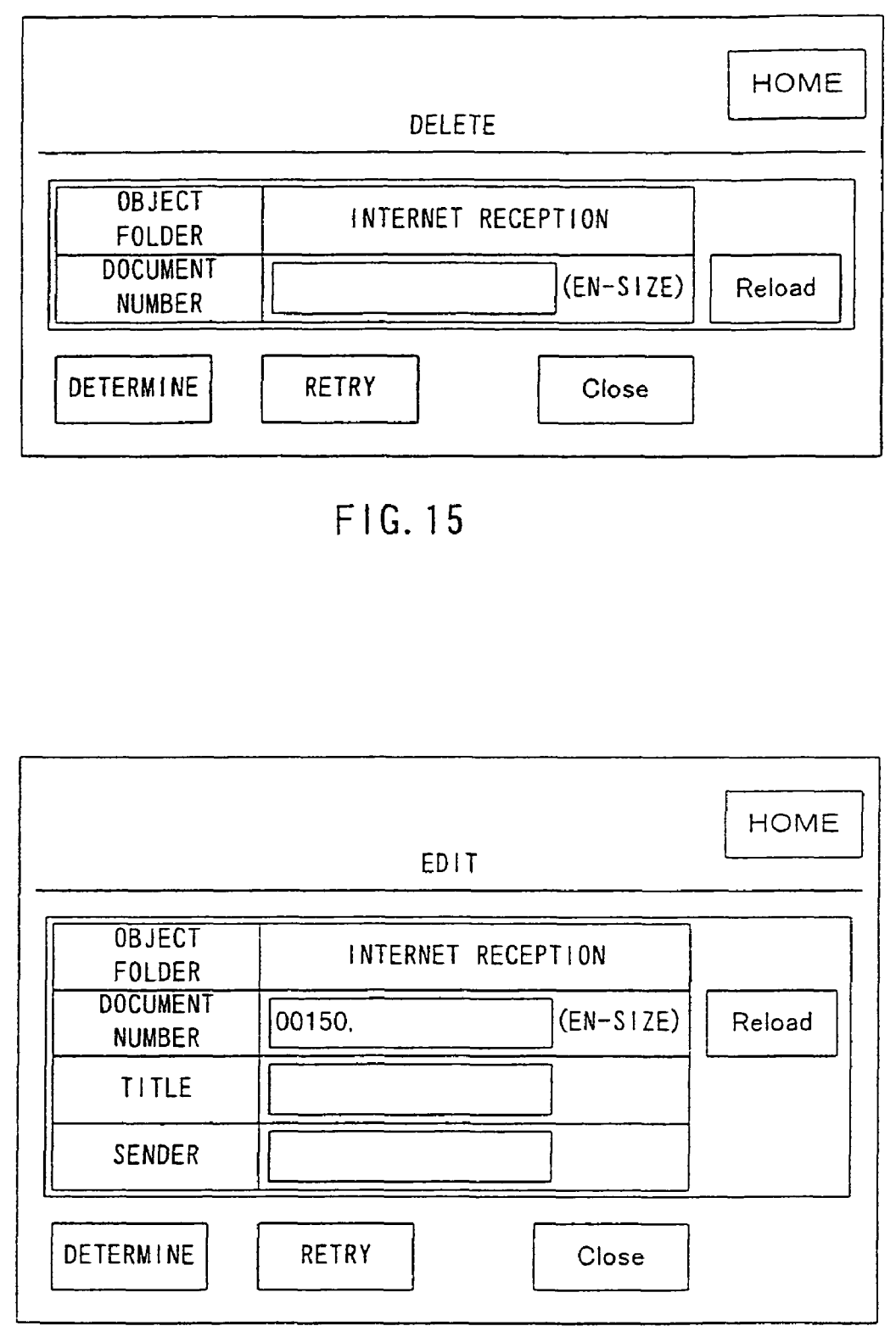

When WWW server section 12 receives the file request, WWW server communication section 31 notifies file providing section 35 of a file name of the HTML file linked to the "delete" icon. File providing section 35 fetches the corresponding file from external storage 4 through file management section 36 to transmit to client machine 202. FIG. 15 illustrates a structure example of a HTML document page used in deleting a document number from the reception list. The document number selected previously is automatically inserted into a column for document number.

The user confirms the document number as a delete object that is automatically inserted into the column for document number and then selects a determine-button. When the determine-button is selected, the delete CGI application is selected as an application type and the request data in which the document number of the delete object is set is transmitted to WWW server section 12.

In addition, in the case where the user selects an "edit" icon after selecting the document number of the processing object, the WWW browser at client machine 202 provides the file request for the HTML file linked to the "edit" icon to WWW server section 12.

When WWW server section 12 receives the file request, WWW server communication section 31 notifies file providing section 35 of a file name of the HTML file linked to the "edit" icon. File providing section 35 fetches the corresponding file from external storage 4 through file management section 36 to transmit to client machine 202. FIG. 16 illustrates a structure example of the HTML document page used in editing a document number, title, sender and other items of the reception list.

The document number selected previously, title and others are automatically inserted into a column for the edit object. When a determine-button is pushed, the edit CGI application is selected as an application type, and the request data in which the document number of the edit object is set is transmitted to WWW server section 12.

In addition, in the case where the user selects a "move" icon, the WWW browser at client machine 202 provides the file request for the HTML file linked to the "move" icon to WWW server section 12.

When WWW server section 12 receives the file request, WWW server communication section 31 notifies file providing section 35 of a file name of the HTML file linked to the "move" icon. File providing section 35 fetches the corresponding file from external storage 4 through file management section 36 to transmit to client machine 202. FIG. 17 illustrates a structure example of the HTML document page used in moving a document number on the reception list.

The document number that is selected before the "move" icon is selected is automatically inserted into a column for the document number. The user enters corresponding folder names into a column for a folder from which the document is moved (source folder) and another column for another folder to which the document is moved (target folder). When a determine-button is selected, the move CGI application is selected as an application type, and the request data in which the document number of the move object is set is transmitted to WWW server section 12.

As described above, the request data for requesting the CGI processing is transmitted from client machine 202 to WWW server section 12. As illustrated in the flowchart in FIG. 12, in WWW server section 12, the CGI string data that is analyzed by CGI string analysis section 32 using the received data (request data) is provided to CGI application deciding section 33 and a corresponding CGI application is decided.

When the delete, edit and move applications are executed, the corresponding CGI application provides an instruction and received data corresponding to the processing content to document generating section 37.

The above description describes about the case of performing various jobs using the internet received document page.

However, it is possible to move to the various jobs using the FAX received document page by the same operation.

When an address book CGI application is executed, this CGI application provides an instruction and received data corresponding to the processing content to address book generating section 38.

When a device setting CGI application and a send CGI application are executed, an instruction and received data corresponding to the processing content are provided to file management section 36.

The received data is provided to document generating section 37 from the delete, edit or move CGI application. When the reception list processing is a delete, the delete CGI application provides the document number that is entered on the HTML document page in FIG. 15 as received data to document generating section 37 to instruct to delete the corresponding document. When the reception list processing is an edit, the edit CGI application provides the document number and edit contents that are entered on the HTML document page in FIG. 16 as received data to document generating section 37 to instruct to edit the corresponding document. When the reception list processing is a move, the move CGI application provides the document number, source folder number and target folder number that are entered on the HTML document page in FIG. 17 as received data to document generating section 37 to instruct to move the corresponding document.

Figure 13:
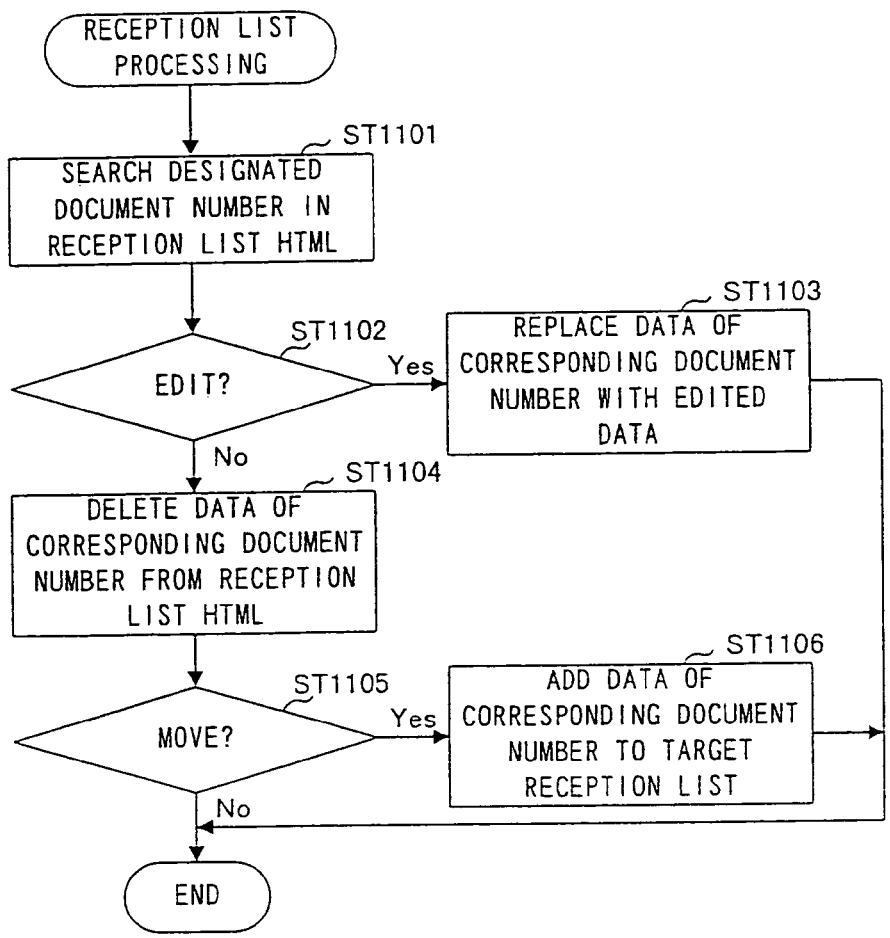
FIG. 13 is a flowchart illustrating an operation of a document list generating section in the network facsimile apparatus according to the above embodiment.

FIG. 13 illustrates a flowchart when document generating section 37 operates by the request data for requesting the CGI processing. The document number provided from the CGI application is searched in the HTML file of the reception list (ST1101). Next, it is decided whether or not the request data instructs the edit processing (ST1102).

For example, when an edit of the internet reception list is instructed as CGI processing, document generating section 37 reads out the HTML file of the internet reception list from external storage 4, and searches a position of the document number of the edit object. Document generating section 37 replaces the data of the corresponding document number (title, sender and others) with the edited data (received data) (ST1103).

The rewrite of a portion in the HTML file of the internet reception list is finished when the HTML file of the internet reception list, in which the data of the corresponding document number is replaced with the edited data, is returned to external storage 4.

On the other hand, when the edit processing is not instructed, the corresponding document number is anyway deleted from the current position in the reception list HTML file because the processing except for an edit is a delete or a move. Therefore, when it is decided that the processing instructed in ST1102 is not the edit, the data of the corresponding document number is deleted from the reception list HTML file (ST1104).

It is next decided whether or not the CGI application instructs as the CGI processing a document move between the reception lists (for example, internet reception list to FAX reception list) (ST1105).

When a document move is instructed, the HTML files of source and target reception lists respectively from/to which the document is moved are both already read out from external storage 4 at ST1101. Since the corresponding document number is already deleted in the HTML files of the source reception, the data of the corresponding document number is added to the HTML file of the target reception list (ST1106). The move of document data between the reception lists is finished when the reception list in which the data of the corresponding document number is deleted and another reception list to which the data of the corresponding document number is added are stored in external storage 4. In addition, when the move of document data is not executed, the document data is just deleted from the reception list.

As described above, since WWW server section 12 transmits the reception list operation page (delete, edit or move) in response to a request from client machine 202, client machine 20 transmits the data and operation content (delete, edit or move) that are entered by a user corresponding to the reception list operation page to WWW server section 12, and document list generating section 37 at WWW server section 12 reflects the user entered data in the HTML file of reception list corresponding to the operation content, the user is able to modify the reception list in homepage format provided from WWW server section 12.

Figure 11:
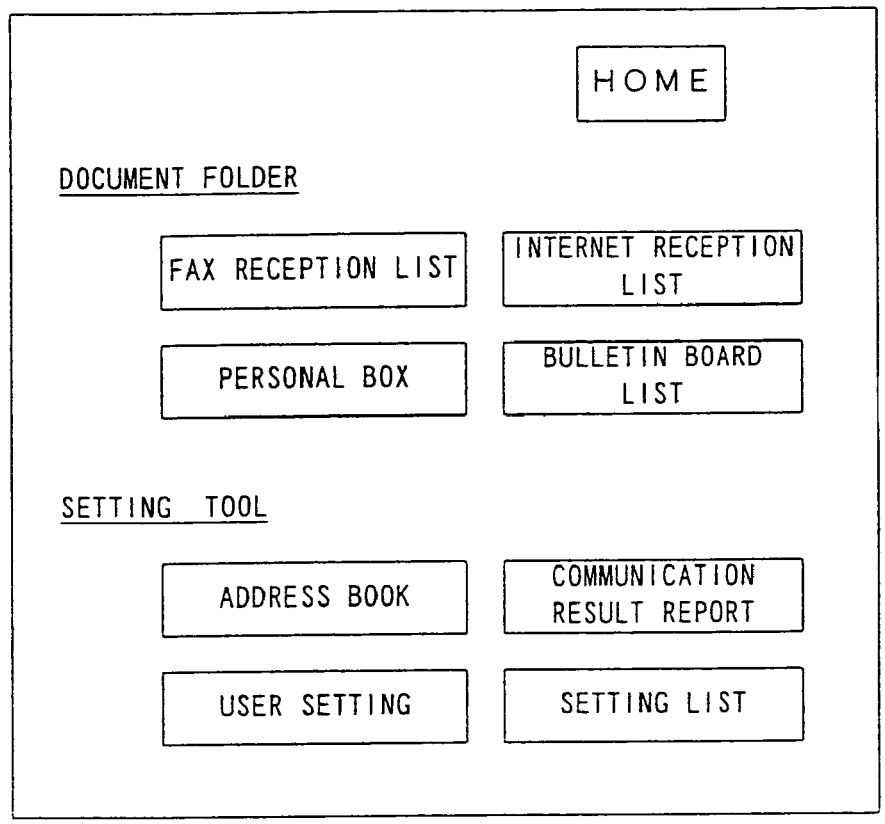
FIG. 11 is a structure diagram of a homepage main page provided by the network facsimile apparatus according to the above embodiment.

In addition, as the premise that the address book processing is executed at ST111, the necessary data is entered on the HTML document page at client machine 202. At ST706 in the flowchart illustrated in FIG. 9, an address book icon is selected instead of internet reception list icon on the main page of the homepage (HTML document page) illustrated in FIG. 11. According to this processing, the file request for the address book HTML file linked to the address book icon is provided to WWW server section 12.

The HTML file of address book is registered at external storage 4 at the server side. In WWW server section 12, file providing section 35 requests file management section 36 to read out an address book html in response to the file request from client machine 202, while transmits a HTML file of read address book html to client machine 202.

The address book page composed of the HTML document according to the address book HTML file received by the WWW browser is displayed on a screen of client machine 202.

FIG. 18 illustrates the HTML document page of address book. In this embodiment, the address book page is composed of address information having name, type, address and check icon, and a frame menu with icons such as add, delete and edit lined up. A symbol indicative of FAX or e-mail is described in a column of a type. In a column of an address, a telephone number is described when the type is FAX and an e-mail address is described when the type is e-mail.

When a user operates the content of the address book that is registered in homepage format at the WWW server side, the user is able to select a job corresponding to the operation content among from the frame menu.

When the user selects an "add" icon, the WWW browser at client machine 202 provides a file request for the HTML file linked to the "add" icon to WWW server section 12.

When WWW server section 12 receives the file request, WWW server communication section 31 notifies file providing section 35 of a file number of the HTML file linked to the "add" icon. File providing section 35 fetches the corresponding file from external storage 4 through file management section 36 to transmit to client machine 202. FIG. 19 illustrates a structure example of a HTML document page used in adding an address from the reception list.

The user enters a name of an address to be added in a column of name, enters FAX or e-mail in a column of type, further enters a FAX number or e-mail address in a column of address, and then selects a determine-button. When the determine-button is selected, the address book CGI application is selected as an application type, and the request data, in which information on the address to be added is set, is transmitted to WWW server section 12.

When the user selects a "delete" icon, the WWW browser at client machine 202 provides a file request for the HTML file linked to the "delete" icon to WWW server section 12. WWW server section 12 transmits the HTML file linked to the "delete" icon to client machine 202 through the process of the case of "add".

FIG. 20 illustrates a structure example of a HTML document page used in deleting an address from the address book. A user enters a name and address of the delete object respectively in columns of name and address (telephone number or e-mail address) and then selects a determine-button. When the determine-button is selected, the address book CGI application is set as an application type, and the request data, in which the number of the delete object is set, is transmitted to WWW server section 12.

When a user selects an "edit" icon, the WWW browser at client machine 202 provides a file request for the HTML file linked to the "edit" icon to WWW server section 12.

Figure 21:
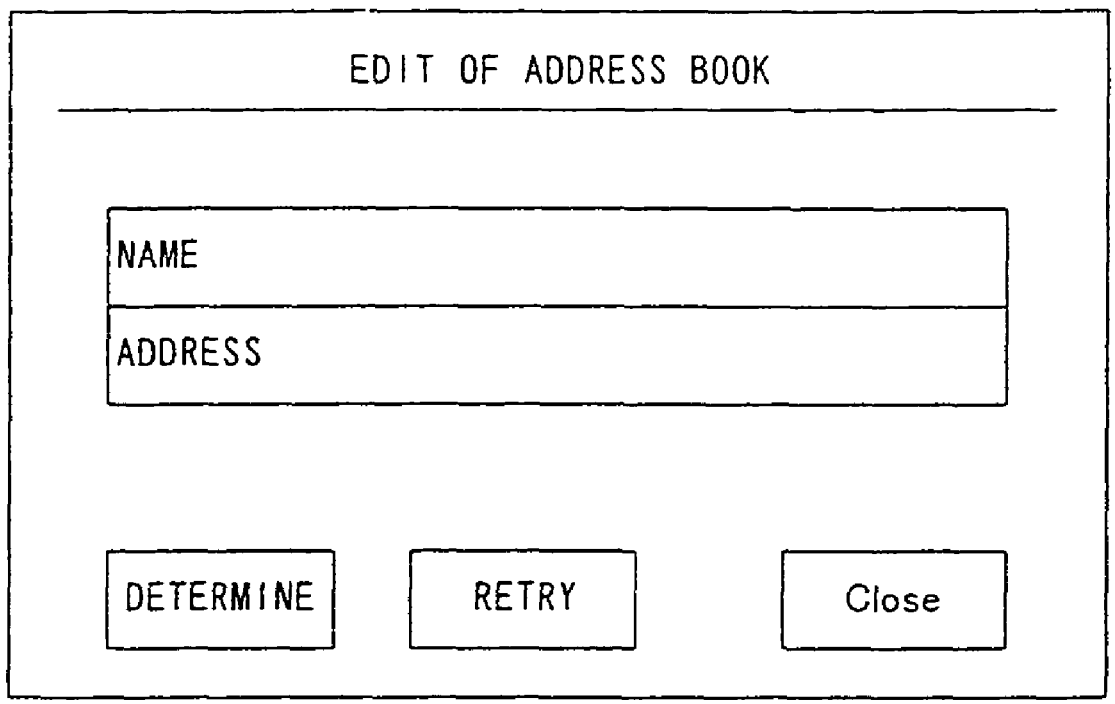
FIG. 21 is a structure diagram of an address book edit page provided by the network facsimile apparatus according to the above embodiment.

When WWW server section 12 receives the file request, WWW server communication section 31 notifies file providing section 35 of a file number of the HTML file linked to the "edit" icon. File providing section 35 fetches the corresponding file from external storage 4 through file management section 36 to transmit to client machine 202. FIG. 21 illustrates a structure example of a HTML document page used in editing a name and address in the address book. The user enters an edited name and/or address for a column of edit object, and then selects a determine-button. When the determine-button is selected, the address book CGI application is set as an application type, and the request data, in which the edit address number is set, is transmitted to WWW server section 12.

Figure 22:
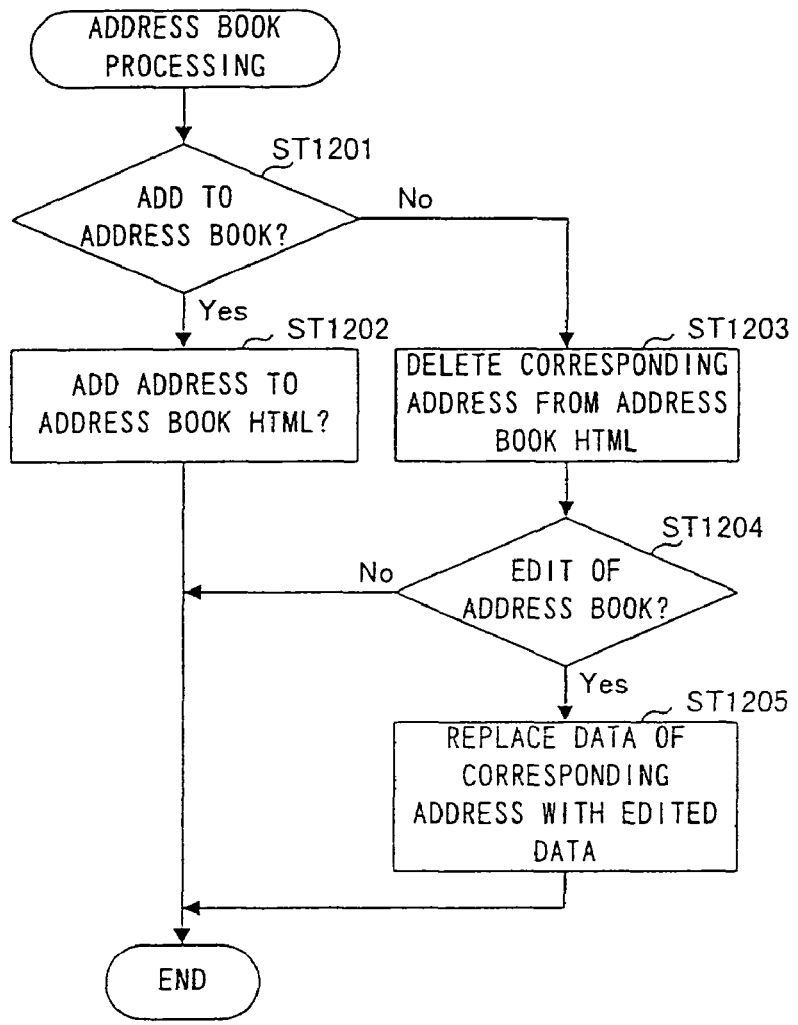
FIG. 22 is a flowchart of address book processing in the network facsimile apparatus according to the above embodiment.

FIG. 22 illustrates a flowchart when address book generating section 37 operates according to request data for requesting CGI processing. Address book generating section 38 receives an instruction indicative of the CGI processing content (add, delete and edit), and received data (name and address) from the address CGI application, while fetches the HTML file of address book from external storage 4.

Address book generating section 38 decides whether or not the instruction indicates an add of address (ST1201), and adds added address and name to the HTML file of address book when the instruction indicates the add of address (ST1202).

On the other hand, when the instruction does not indicate an add of address, address book generating section 37 deletes the corresponding address data contained in the received data from the HTML file of address book because the processing to be executed is edit or delete (ST1203). It is next decided whether or not the instruction indicates an edit of address book (ST1204). When the instruction indicates the edit, address book generating section 37 searches the corresponding address from the HTML file and replaces the corresponding address with the edited address data and/or name (ST1205). The latest address data is thus reflected in the homepage of the address book by writing the HTML file of the changed address book into external storage 4.

AS described above, since WWW server section 12 is able to provide an address book in homepage format to client machine 202, and display a HTML document page to add or modify (delete or edit) an address of address book in response to a request from client machine 202 on a screen of client machine 202, and the user entered added or modified data and the operation content are provided to address book generating section 38 to be reflected in the HTML file of address file, the user is able to add and modify the content of the address book provided in homepage format from WWW server section 12 using client machine 202.

The network facsimile apparatus has panel section 7 and a short dial table in which a short dial is related to telephone number and e-mail address. When a user pushes down the short dial, the corresponding telephone number or e-mail data is read from the short dial table to be provided to FAX/speech communication section 9 or e-mail communication section 13. Then, FAX/speech communication section 9 calls to the provided telephone number to transmit facsimile data, or e-mail communication section 13 transmits e-mail data to the provided e-mail address from network controller 10.

The above-described short dial table is added or modified arbitrary by a user. However, the rewrite in the short dial table is not reflected in the address book in homepage format provided to the user from WWW server section 12. Therefore, another processing is necessary to correctly matches the short dial table and the content of the HTML file of address book.

In order to execute the processing, address book generating section 38 executes incorporation processing of the address book with the address book CGI application. When the power of the network facsimile apparatus is turned on, the data of short dial table is transferred to address book generating section 38. Meanwhile, the HTML file of address book is read out from external storage 4. The telephone numbers and e-mail addresses registered in the short dial table that are transferred are incorporated in the HTML file of address book. According to this processing, the content of the short dial table and the content of the HTML file of address book are matched. The processed HTML file of address book is returned to external storage 4.

The operation to set a storage period of a document registered in the homepage will be described next. In above-described ST706, when a user setting icon is selected on the homepage main page, a file request for the HTML file linked to the user setting icon is transmitted to WWW server section 12 from client machine 202. When WWW server section 12 receives the file request for the HTML file of user setting, file providing section 35 fetches the corresponding user setting html from external storage 4 to transmit to client machine 202.

Figure 23:
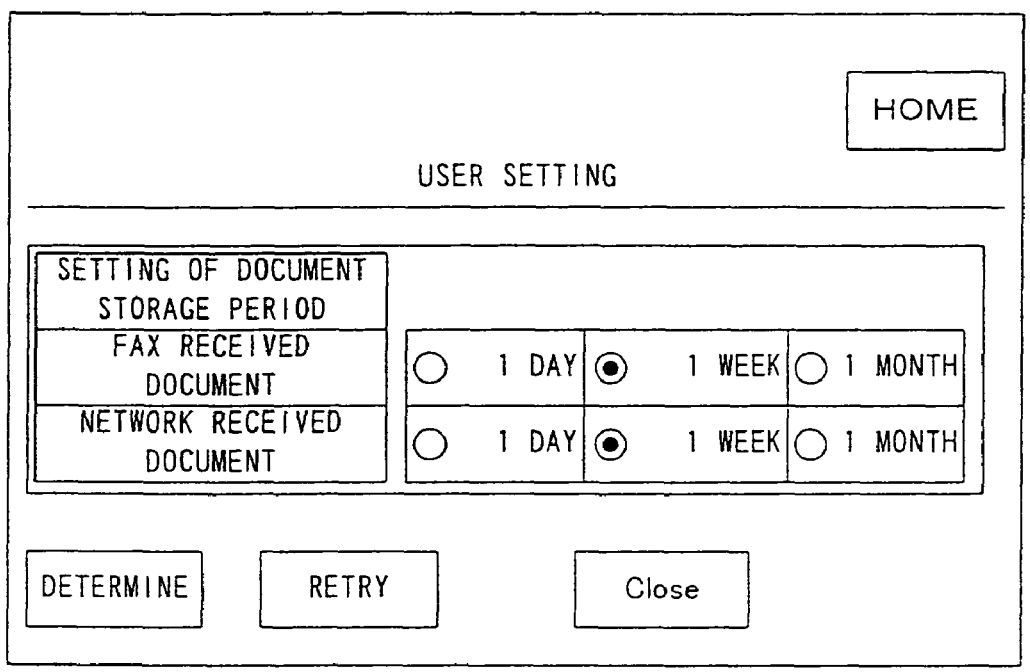
FIG. 23 is a structure diagram of a storage period setting page for user setting provided by the network facsimile apparatus according to the above embodiment.

The WWW browser at client machine 202 displays a user setting page using the user setting html on a screen. FIG. 23 illustrates a structure example of the user setting page. The user setting page is composed so that a storage period can be set for every FAX received document and every network received document. 1 day, 1 week and 1 month are set as a storage period in the example illustrated in FIG. 23, however it may be possible to make a structure for enabling any setting of storage period. When a user selects a storage period and a document type on the user setting page and selects a setting button, the set data is transmitted to WWW server section 12 along with the CGI processing request for a device setting CGI application.

In WWW server section 12, CGI application deciding section 33 provides the CGI processing request to the device setting CGI application. The device setting CGI application provides setting data such as a storage period and a document type to file management section 36 to request a change of device setting.

File management section 36 manages storage periods of documents stored at external storage 4 (various types of HTML file, TIFF file group and speech file group). When file management section 36 receives an instruction for changing a storage period from the device setting CGI application, file management section 36 rewrites a tale in which a storage period of the corresponding type is registered according to the instruction content.

Figure 24:
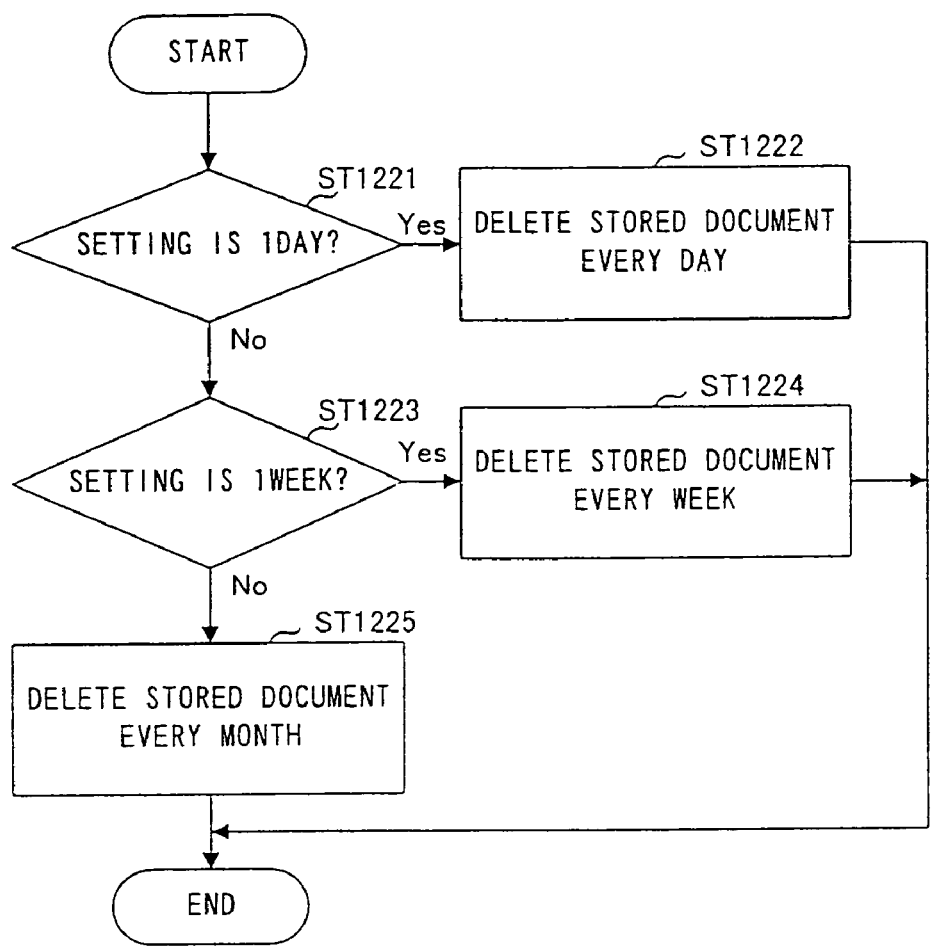
FIG. 24 is a flowchart of a delete operation of file management section in the network facsimile apparatus according to the above embodiment.

FIG. 24 is a flowchart concerning a document storage management by file management section 36. File management section 36 manages storage periods on a unit basis for every document type. When file management section 36 detects that one day has passed since the data of receiving a document whose storage period is 1 day (ST1221), file management section 36 deletes the corresponding document (ST1222). When file management section 36 detects that one week has passed since the data of receiving a document whose storage period is 1 week (ST1223), file management section 36 deletes the corresponding document (ST1224). Further, when file management section 36 detects that one month has passed since the data of receiving a document whose storage period is 1 month, file management section 36 deletes the corresponding document (ST1225).

As described above, since a document storage period (device setting) is displayed on a HTML document page designated by a user at client machine 202 in response to a request from client machine 202, and the data and device setting instruction entered by the user is provided to WWW server section 12 to be reflected in the management table in file management section 36, the document storage period (device setting) can be set using client machine 202 in the same operation as accessing to a homepage.

The present invention is not limited to the above described embodiments, and various variations and modifications may be possible without departing from the scope of the present invention.

This application is based on the Japanese Patent Application No. HEI 10-372959 filed on Dec. 28, 1998, entire content of which is expressly incorporated by reference herein.

What is claimed:

1. A communication apparatus connected to a terminal apparatus via a network, the communication apparatus comprising:
   a storage that stores a received document file and an HTML file of a user setting page;
   a file manager that stores a storage period for the received document file, determines whether or not the received document file has been stored in the storage for the storage period, and deletes the document file when the document file is determined to have been stored in the storage for the storage period, the storage period of a document file starting when the document file is received at the communication apparatus, such that a received document file is not deleted before the storage period of the received document file exceeds the stored storage period, the storage period being independent of an operation performed on the received document file by the communication apparatus; and
   a web server that transmits, to the terminal apparatus, the HTML file of the user setting page, the transmitted user setting page configured to be displayed at the terminal apparatus so that a user at the terminal apparatus can request a change of the storage period, and instructs the file manager to change the storage period, when the user at the terminal apparatus requests the change of the storage period, the user setting page identifying a plurality of document types together with a plurality of defined storage periods for each document type and being configured such that a user can select one of the plurality of defined storage periods or a user defined storage period for each document type.

2. The communication apparatus according to claim 1, wherein the user setting page includes a predetermined actuator and the user requests the change of the storage period by operating the predetermined actuator.

3. The communication apparatus according to claim 1, wherein one of the periods is one day.

4. The communication apparatus according to claim 1, wherein one of the periods is one week.

5. The communication apparatus according to claim 1, wherein one of the periods is one month.

6. The communication apparatus according to claim 1, wherein the document file is a file of facsimile data received by facsimile.

7. The communication apparatus according to claim 1, wherein the document file is a file of network data received via the network.

8. A communication method using a communication apparatus connected to a terminal apparatus via a network, the communication method comprising:
   storing a document file of a received document and an HTML file of a user setting page;
   storing a storage period for the received document file, the storage period of the document file starting when the document file is received at the communication apparatus, such that a received document file is not deleted before the storage period of the received document file exceeds the stored storage period, the storage period being independent of an operation performed on the received document file by the communication apparatus;
   determining whether or not the received document file has been stored for the storage period;
   deleting the document file when the document file is determined to have been stored for the storage period;
   transmitting, to the terminal apparatus, the HTML file of the user setting page, the transmitted user setting page configured to be displayed at the terminal apparatus so as to enable a user at the terminal apparatus to request a change of the storage period; and
   instructing a change of the storage period, when the user, at the terminal apparatus, requests the change of the storage period, the user setting page identifying a plurality of document types together with a plurality of defined storage periods for each document type and being configured such that a user can select one of the plurality of defined storage periods or a user defined storage period for each document type.

9. The communication method according to claim 8, wherein the user setting page includes a predetermined actuator and the user requests the change of the storage period by operating the predetermined actuator.

10. The communication method according to claim 8, wherein one of the periods is one day.

11. The communication method according to claim 8, wherein one of the periods is one week.

12. The communication method according to claim 8, wherein one of the periods is one month.

13. The communication method according to claim 8, wherein the document file is a file of facsimile data received by facsimile.

14. The communication method according to claim 8, wherein the document file is a file of network data received via the network.

15. The communication apparatus according to claim 1, the web server being configured to transmit the HTML file of the user setting page to the terminal apparatus in response to a request for the user setting page from the terminal apparatus.

16. The communication method according to claim 8, the transmitting comprising transmitting the HTML file of the user setting page to the terminal apparatus in response to a request for the user setting page from the terminal apparatus.

* * * * *